United States Patent [19]
Kast et al.

[11] 3,931,182

[45] Jan. 6, 1976

[54] LACTONES OF THE DIAZAXANTHENE SERIES, THEIR PRODUCTION AND THEIR USE AS DYE-FORMING COMPONENTS FOR COPYING METHODS

[75] Inventors: Hellmut Kast, Bobenheim-Roxheim; Guenter Dunkelmann, Ludwigshafen, both of Germany

[73] Assignee: BASF Aktiengesellschaft, Ludwigshafen (Rhine), Germany

[22] Filed: July 31, 1974

[21] Appl. No.: 493,384

[30] Foreign Application Priority Data
Aug. 1, 1973 Germany............................ 2338953

[52] U.S. Cl. .................... 260/256.4 F; 260/247.1 L; 260/247.2 B; 260/256.4 C; 260/256.5 R
[51] Int. Cl.$^2$....................................... C07D 239/00
[58] Field of Search............................. 260/256.4 F

*Primary Examiner*—Donald G. Daus
*Assistant Examiner*—James H. Turnipseed
*Attorney, Agent, or Firm*—Johnston, Keil, Thompson & Shurtleff

[57] ABSTRACT

Lactones of the diazaxanthene series, their manufacture from a benzoylbenzoic acid and a pyrimidine, and their use as dye-forming components in the red range for pressure-sensitive recording material.

7 Claims, No Drawings

LACTONES OF THE DIAZAXANTHENE SERIES, THEIR PRODUCTION AND THEIR USE AS DYE-FORMING COMPONENTS FOR COPYING METHODS

The invention relates to lactones of the diazaxanthene series of the formula (I):

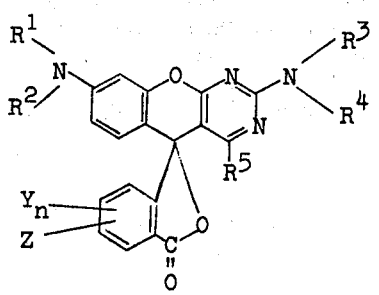

(I)

in which
$R^1$ is hydrogen or alkyl of one to three carbon atoms;
$R^2$ is phenyl or phenyl bearing alkyl of one to three carbon atoms, chloro and/or bromo as substituents;
$R^3$ and $R^4$ independently of one another each is hydrogen; alkyl, cyanoalkyl or hydroxyalkyl of one to six carbon atoms per alkyl; alkoxyalkyl of two to twelve carbon atoms; carboalkoxyalkyl of four to eleven carbon atoms; or phenylalkyl of seven to twelve carbon atoms; or together with the nitrogen is a saturated five-membered or six-membered heterocyclic ring which may also contain $R^6$—N, S or O ($R^6$ being hydrogen or alkyl of one to six carbon atoms);
$R^5$ is hydrogen, chloro or alkyl of one to three carbon atoms;
Y is hydrogen, chloro, nitro or alkyl of one to three carbon atoms;
Z is hydrogen, chloro, nitro or alkyl of one to three carbon atoms; and
n is one of the integers 1, 2 and 3.

The lactones of the formula I are colorless compounds. Used as such or dissolved in non-polar or weakly polar solvents such as hydrocarbons, chlorohydrocarbons, esters or ketones, they react with acid substances, with cleavage of the lactone ring, to form the corresponding deeply colored dye salts. Since this reaction is caused even by substances such as china clay, zeolites, bentonites, silica and phenolic condensation products, which are suitable for coating, or incorporation in, paper, the lactones of this invention are outstandingly suitable as dye-forming components for pressure-sensitive recording materials, especially for the production of copying papers. Most of the shades obtained are in the red range. The dye-forming reaction, on contacting the lactones with acidic substances, takes place instantaneously and completely, and the shade produced is distinguished by particularly high intensity and brilliance.

Preferred radicals for the compounds of formula (I) are:

for $R^1$: hydrogen;
for $R^2$: phenyl, o-tolyl, p-tolyl, o-chlorophenyl and p-chlorophenyl;
for $R^3$ and $R^4$: methyl, ethyl, propyl, butyl, 3-hydroxyethyl and 3-hydroxypropyl;

for

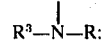

a morpholine, piperidine, piperazine, N'-methylpiperazine or pyrrolidine ring;
for $R^5$: methyl;
for Y: hydrogen and chloro; and
for Z: methyl, ethyl and trifluoromethyl.

Lactones of formula (I) have particular industrial significance as dye-forming components when $R^1$ is hydrogen;
$R^2$ is phenyl, o-tolyl, p-tolyl, o-chlorophenyl or p-chlorophenyl;
$R^3$ and $R^4$ independently of one another is each methyl, ethyl, propyl and/or n-butyl or

is pyrrolidine;
$R^5$ is methyl;
Y is hydrogen; and
Z is hydrogen.

The diazaxanthenes of formula (I) may be prepared by a conventional method by condensation of a benzoylbenzoic acid of formula (II):

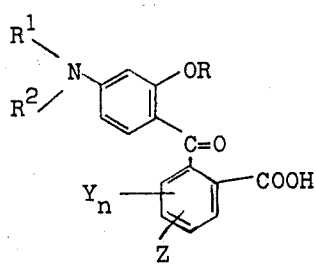

(II)

with a pyrimidine of formula (III)

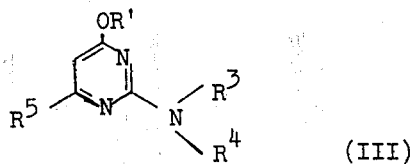

(III)

in which R and R' is each hydrogen or lower alkyl or acyl. The condensation is conveniently carried out in the presence of a water-eliminating agent such as sulfuric acid, polyphosphoric acid, acetic anhydride or zinc chloride at elevated temperature, for example at 60° to 160°C in the absence or presence of a solvent such as acetic acid, formic acid or propionic acid. The reaction is over as a rule after from two to eight hours. The cooled reaction mixture may be introduced into ice-water and the insoluble reaction product separated for the purpose of processing. The reaction product may be further purified, for example by dissolving it and reprecipitating it or by recrystallizing it.

Examples of suitable benzoylbenzoic acids are: 2-(4'-o-toluidino-2'-hydroxybenzoyl)-benzoic acid, 2-(4'-p-toluidino-2'-hydroxybenzoyl)-benzoic acid, 2-(4'-o-chlorophenyl-2'-hydroxybenzoyl)-benzoic acid, 4-methyl-2-(4'-o-toluidino-2'-hydroxybenzoyl)-benzoic acid, 3,4,5,6-tetrachloro-2-(4'-o-toluidino-2'-hydroxybenzoyl)-benzoic acid and 2-(4'-methyl-o-toluidino-2'-hydroxybenzoyl)-benzoic acid.

Examples of suitable pyrimidines are: 2-dimethylamino-6-methylenepyrimidone-(4), 2-diethylamino-6-methylpyrimidone-(4), 2-dipropylamino-6-methylpyrimidone-(4), 2-dibutylamino-6-methylpyrimidone-(4), 2-pyrrolidino-6-methylpyrimidone-(4), 2-morpholino-6-methylpyrimidone-(4), 2-N-methylpiperazino-6-methylpyrimidone-(4), piperidino-6-methylpyrimidone-(4), 2-dimethylaminopyrimidone-(4), N-diethylaminopyrimidone-(4).

The lactones obtained may be used as dye precursors for pressure-sensitive recording materials, for example in duplicating methods. They may for example be made into a paste, the paste is applied to paper and the surface is provided with a protective layer. A particularly advantageous embodiment consists in enclosing the dye precursor dissolved in a solvent having little or no volatility, for example chloroparaffin, trichlorodiphenyl or an alkylbenzene bearing one or more substituents, in microcapsules and applying these to paper. Under writing pressure the microcapsules are brought into contact with an acid receptive layer with the result that the characters appear.

The following Examples illustrate the invention. The parts and percentages specified in the following Examples are by weight.

EXAMPLE 1

A mixture of 347 parts of 2-(4'-(o-toluidino)-2'-hydroxybenzoyl)-benzoic acid, 237 parts of 2-dibutylamino-4-hydroxy-6-methylpyrimidine, 204 parts of acetic anhydride and 1000 parts of glacial acetic acid is heated for eight hours at 100°C. After the reaction solution has cooled it is poured onto 10,000 parts of ice-water and the precipitate formed is filtered off and washed with water. The moist crude product is recrystallized from methanol. 365 parts of the compound is obtained. It has a melting point of 158° to 160°C.

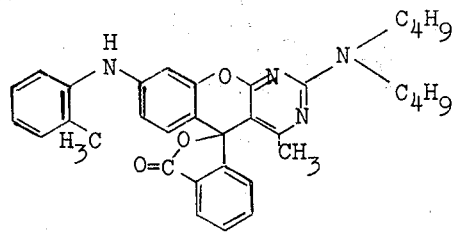

A solution of this compound in dodecylbenzene is enclosed in microcapsules and applied to the surface of paper. When characters are written on the uncoated side of the paper the microcapsules on the reverse side are ruptured and the contents coming into contact with the acid receptive layer of a paper placed beneath the same form a bluish red copy of the characters.

In a manner analogous to that described in Example 1 the following dye precursors are obtained from appropriate starting compounds; they give characters in the shades indicated in contact with acid-reacting substances when written upon.

| Example | Dye percursor | Shade |
|---|---|---|
| 2 | | bluish red |
| 3 | | bluish red |
| 4 | | bluish red |
| 5 | | red |

| Example | Dye precursor | Shade |
|---|---|---|
| 6 | (structure) | bluish red |
| 7 | (structure) | red |
| 8 | (structure) | bluish red |
| 9 | (structure) | bluish red |
| 10 | (structure) | bluish red |
| 11 | (structure) | red |
| 12 | (structure) | yellowish red |
| 13 | (structure) | bluish red |
| 14 | (structure) | red |

| Example | Dye precursor | Shade |
|---|---|---|
| 15 | 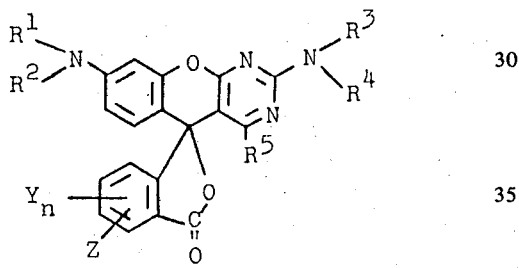 | bluish red |
| 16 | | bluish red |
| 17 | 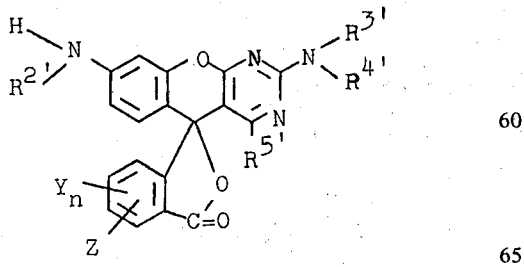 | red |

We claim:

1. A lactone of the diazaxanthene series of the formula:

in which
R$^1$ is hydrogen or alkyl of one to three carbon atoms;
R$^2$ is phenyl; or phenyl monosubstituted by alkyl of one to three carbon atoms, chloro or bromo;
R$^3$ and R$^4$ independently of one another are each alkyl of one to six carbon atoms per alkyl or alkoxyalkyl of two to twelve carbon atoms; or R$^3$ and R$^4$ together with the nitrogen form a piperidino group, a pyrrolidino group or a N$^1$-methyl-piperazino group;
R$^5$ is hydrogen or alkyl of one to three carbon atoms;
Y is hydrogen or chloro;
Z is hydrogen or chloro; or Z is nitro or alkyl of one to three carbon atoms when Y is hydrogen; and
n is one of the integers 1, 2 and 3.

2. A lactone of the diazaxanthene series of the formula in which
R$^{2'}$ is phenyl, o-tolyl, p-tolyl, o-chlorophenyl or p-chlorophenyl;
R$^{3'}$ and R$^{4'}$ independently of one another are each methyl, ethyl, propyl or butyl;
R$^{5'}$ is hydrogen or methyl;
Y is hydrogen or chloro;
Z is hydrogen or chloro; or Z is hydrogen, nitro or methyl when Y is hydrogen; and
n is 3.

3. A lactone as claimed in claim 2, wherein
R$^{2'}$ is phenyl, o-tolyl, p-tolyl, o-chlorophenyl or p-chlorophenyl;
R$^{3'}$ and R$^{4'}$ are methyl, ethyl, propyl or butyl;
R$^{5'}$ is methyl and
Z and Y are hydrogen.

4. A lactone of the diazaxanthene series of the formula in which
R$^{2'}$ is phenyl, o-tolyl, p-tolyl, o-chlorophenyl or p-chlorophenyl; and $-N\begin{smallmatrix}R^{3'}\\R^{4'}\end{smallmatrix}$ is piperidino, pyrrolidino or N'-methyl-piperazino.

5. A compound as claimed in claim 3 having the formula

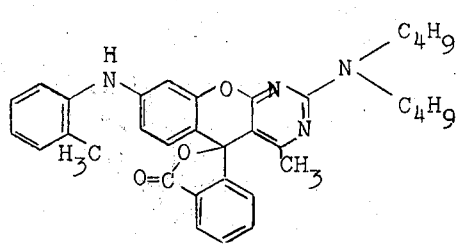

6. A compound as claimed in claim 3 having the formula
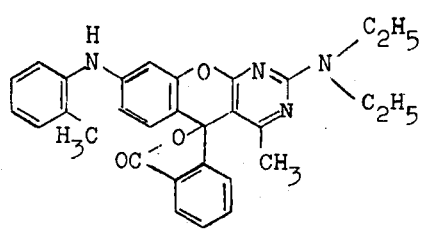
7. A compound as claimed in claim 4 having the formula
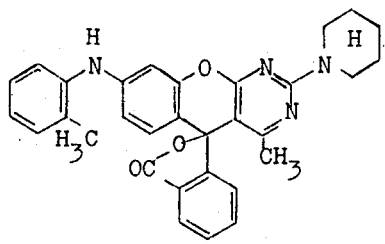
* * * * *

UNITED STATES PATENT AND TRADEMARK OFFICE
CERTIFICATE OF CORRECTION

PATENT NO. : 3,931,182
DATED : January 6, 1976
INVENTOR(S) : Hellmut Kast et al

It is certified that error appears in the above-identified patent and that said Letters Patent are hereby corrected as shown below:

In Column 2, Line 5, delete " $R^3$-N-R: " and substitute -- $R^3$-N-$R^4$: --

In Column 4, formula for Example 2, delete " 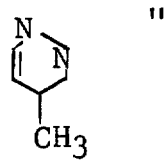 "

and substitute -- 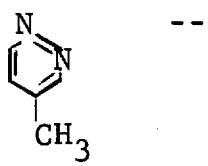 --

In Column 4, formula for Example 3, delete " 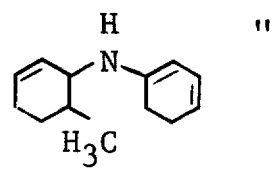 "

and substitute -- 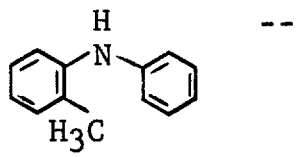 --

In Column 5, formula for Example 11, delete " 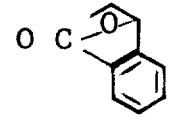 "

and substitute -- 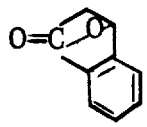 --

Signed and Sealed this

Twelfth Day of October 1976

[SEAL]

Attest:

RUTH C. MASON
Attesting Officer

C. MARSHALL DANN
Commissioner of Patents and Trademarks